United States Patent [19]

Kampschulte et al.

[11] Patent Number: 5,662,852
[45] Date of Patent: Sep. 2, 1997

[54] MASS-COLORED FORMED STRUCTURES BASED ON AROMATIC POLYAMIDES, MASS-COLORED FIBER, AND PREMIX FOR PRODUCING MASS-COLORED FORMED STRUCTURES

[75] Inventors: Uwe Kampschulte, Hattersheim; Peter Klein, Wiesbaden; Richard Neuert, Winkelhaid, all of Germany

[73] Assignee: Hoechst Aktiengesellschaft, Germany

[21] Appl. No.: 368,435

[22] Filed: Jan. 4, 1995

[30] Foreign Application Priority Data

Jan. 6, 1994 [DE] Germany ............. 44 00 248.3

[51] Int. Cl.⁶ .............................. D01F 6/00
[52] U.S. Cl. ............... 264/204; 264/184; 264/205; 264/210.6; 264/210.8; 264/288.4; 264/331.19; 264/290.5
[58] Field of Search ............. 264/184, 204, 264/205, 210.8, 210.6, 288.4, 290.5, 331.19; 524/104, 233

[56] References Cited

U.S. PATENT DOCUMENTS

| | | | |
|---|---|---|---|
| 3,536,658 | 10/1970 | Wich | 524/104 |
| 3,671,542 | 6/1972 | Kwolek | 524/104 X |
| 3,852,106 | 12/1974 | Incremona et al. | 117/218 |
| 3,903,046 | 9/1975 | Greber et al. | 260/47 CP |
| 4,532,275 | 7/1985 | Aito et al. | 523/400 X |
| 5,084,526 | 1/1992 | Harris et al. | 525/425 |

FOREIGN PATENT DOCUMENTS

| | | |
|---|---|---|
| 0 188 090 | 7/1986 | European Pat. Off. . |
| 0 295 672 | 12/1988 | European Pat. Off. . |
| 0 356 579 | 3/1990 | European Pat. Off. . |
| 0 364 891 | 4/1990 | European Pat. Off. . |
| 0 364 892 | 4/1990 | European Pat. Off. . |
| 0 364 893 | 4/1990 | European Pat. Off. . |
| 0 424 860 | 5/1991 | European Pat. Off. . |

OTHER PUBLICATIONS

DATABASE WPI, Section Ch, Week 7550 Derwent Publications Ltd., London, GB; Class A 23 AN 75–82079W & JP A 50 010 845 (Mitsubishi Rayon KK), Feb., 4, 1975.

DATABASE WPI, Section Ch, Week 7506 Derwent Publications Ltd., London, GB; Class A23 AN 75–09967W & JP A 49 115 148 (Mitsubishi Rayon Co Ltd) Nov. 2, 1974.

DATABASE WPI, Section Ch, Week 8929 Derwent Publications Ltd., London, GB; Class A 23, AN 89–202166 & JP A 01 139 814 (Kuraray KK), Jun. 1, 1989.

DATABASE WPI, Section Ch, Week 8929 Derwent Publications Ltd., London, GB; Class A 23 AN 89–202165 & JP A 01 139 813 (Kuraray KK0), Jun. 1, 1989.

Chemical Abstracts, vol. 90, No. 16, Apr. 16, 1979 Columbus, Ohio, Abstract No. 122950p, Yamamoto et al., "Colored Aromatic Polyamide Fibers" Seite 67, Spalte 2; & JP A 53 126 313 (Teijin Ltd.) Nov. 4, 1978.

*Primary Examiner*—Judy M. Reddick
*Attorney, Agent, or Firm*—Connolly & Hutz

[57] ABSTRACT

A process for producing mass-colored fiber or film, comprises the steps of:

a) preparing a premix by grinding a composition comprising a polar aprotic organic solvent, 5 to 30% by weight of an aromatic polyamide and 0.5 to 5% by weight of a color-conferring solid component so that the color-conferring solid component has particles with an average diameter of less than 200 nm, b) preparing a forming solution by mixing the premix produced in step a) with a solution comprising a polar aprotic organic solvent and an aromatic polyamide which corresponds to the aromatic polyamide used in step a), just upstream of a forming die, c) extruding the forming solution through the forming die which comprises orifices in a predetermined number and shape to produce primary fiber or film, d) removing the polar aprotic organic solvent in a conventional manner to leave solvent-leaner or-free fiber or film of sufficient mechanical stability and nontackiness for further processing, and e) optionally orienting the resulting fiber or film in a convention manner.

10 Claims, 1 Drawing Sheet

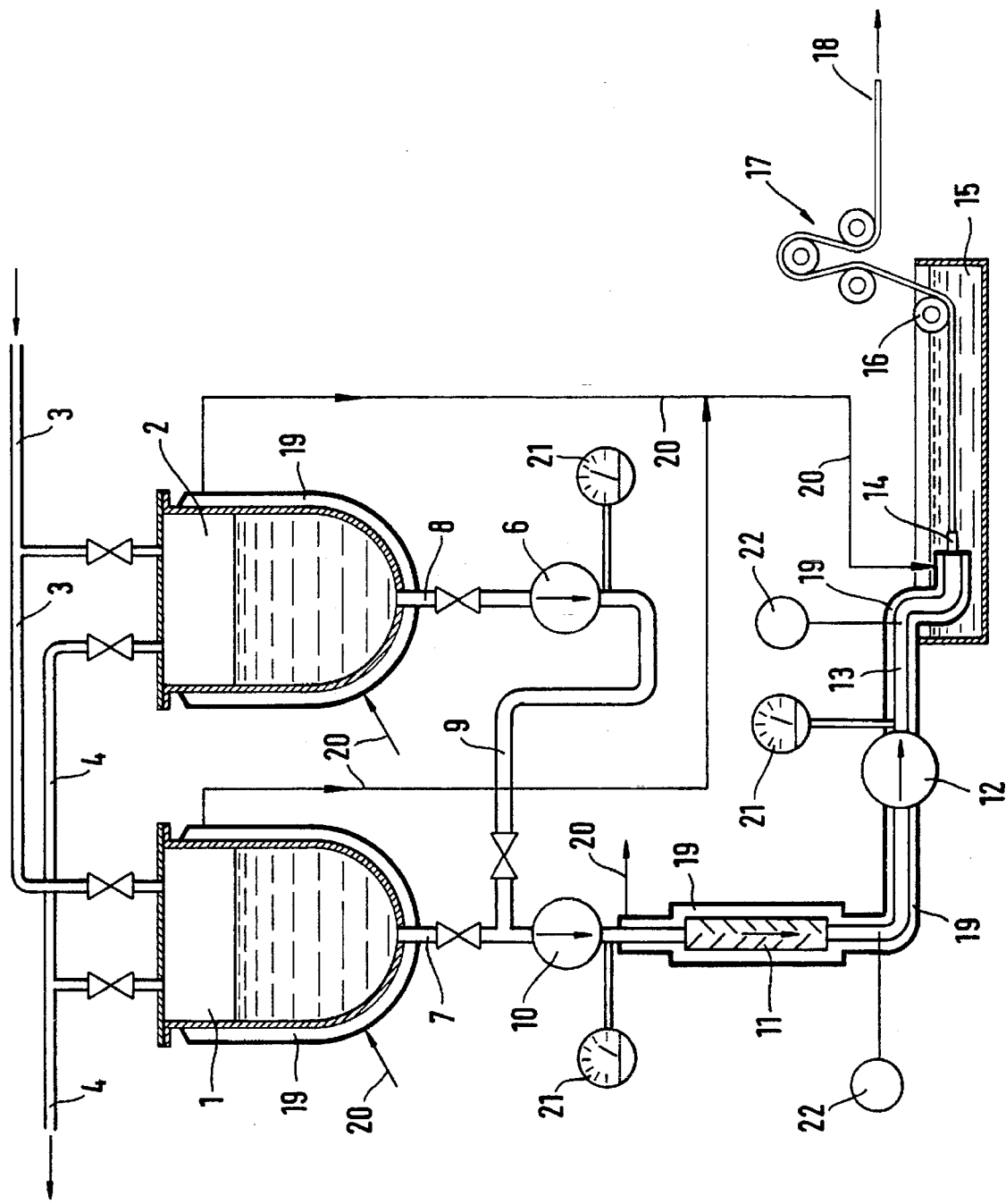

MASS-COLORED FORMED STRUCTURES BASED ON AROMATIC POLYAMIDES, MASS-COLORED FIBER, AND PREMIX FOR PRODUCING MASS-COLORED FORMED STRUCTURES

The present invention relates to a specific process for mass-coloring fiber or film based on aromatic polyamides, to selected mass-colored fibers of high strength and high filament linear densities, and to premixes which are suitable for producing mass-colored formed structures.

Aromatic polyamides—also known an aramids—are known fiber-forming materials of high chemical resistance. Aramid fibers are notable in particular for good mechanical properties, such as high strengths and moduli.

It is common knowledge that formed structures in aromatic amides are difficult or impossible to color by dyeing. The customary dyeing processes, such as bath or piece dyeings, produce only weak colorings of these structures. There is a need for colored aramid fibers which combine a high level of color and fastness with good mechanical and optical properties, such as high luster.

It is further known of polymer materials which are difficult to dye to produce formed structures by mass coloration whereby the foraging compound (mass) is admixed with suitable pigments or other coloring matter and the forming or shaping is effected using the colored mass.

Such forming processes have been described for aramids. For instance, EP-A-295,672 and EP-A-356,579 disclose processes for producing high-strength, high-modulus para-aramid fibers using a spinning solution comprising concentrated sulfuric acid, para-aramid and an organic pigment which is soluble in sulfuric acid. The fibers described and their methods of production are restricted to the use of aramids and organic pigments that are processible in sulfuric acid.

The mass coloration of aramid structures formable from polar aprotic organic solvents has not been described before.

It has now been found that such formed structures, especially fibers, are simple to produce from solution and that the fibers obtained have high strengths.

The process of the present invention involves adding a pigment premix to the forming solution which is already present in the forming apparatus. In this way it is possible to make changes to the mass coloration without first having to clean the entire apparatus. The process of the present invention is thus notable for high flexibility.

The present invention accordingly provides a process for producing mass-colored formed structures, such as fiber or film, comprising the measures of:

a) preparing a premix by grinding a composition comprising a polar aprotic organic solvent, 5 to 30% by weight of an aromatic polyamide and 0.5 to 5% by weight of a color-conferring solid component so that the color-conferring solid component has particles with an average diameter of less than 200 mn, in particular from 80 to 150 nm, b) preparing a forming solution by mixing the premix produced in step a) with a solution comprising a polar aprotic organic solvent and an aromatic polyamide which corresponds to the aromatic polyamide used in step a), just upstream of the forming die, c) extruding the forming solution through a forming die which comprises orifices in a predetermined number and shape to produce primary formed structures, d) removing the polar aprotic organic solvent in a conventional manner to leave solvent-leaner or-free formed structures of sufficient mechanical stability and nontackiness for further processing, and e) optionally orienting the resulting formed structures in a conventional manner.

The term "fiber" is to be understood in the context of this invention in its widest sense; fiber as used herein thus includes for example endless, continuous filament fibers, such as monofilaments or multifilaments, or staple fiber, or pulp.

The term "film" as used herein is likewise to be understood in its broadest sense; it thus includes for example embodiments in a very wide range of thicknesses or functions, such as membranes, coatings or, in particular, sheet materials.

The term "formed structure" as used herein is likewise to be understood in its broadest sense; it thus comprehends any formed or shaped article that is obtainable using the premix of the present invention in any desired forming or shaping process.

The process of the present invention can in principle be carried out using any aramid which is soluble in a polar aprotic solvent.

A soluble aromatic polyamide for the purposes of this invention is any aromatic polyamide which has a solubility in N-methylpyrrolidone of at least 50 g/l at 25° C.

The polar aprotic organic solvent preferably comprises at least one solvent of the amide type, for example N-methyl-2-pyrrolidone, N,N-dimethylacetamide, tetramethylurea, N-methyl-2-piperidone, N,N'-dimethylethyleneurea, N,N,N',N'-tetramethylmaleamide, N-methylcaprolactam, N-acetylpyrrolidine, N,N-diethylacetamide, N-ethyl-2-pyrrolidone, N,N'-dimethylpropionamide, N,N-dimethylisobutylamide, Nmethylformamide, N,N'-dimethylpropyleneurea. The preferred organic solvents for the process of the present invention are N-methyl-2-pyrrolidone, N,N-dimethylacetamide and a mixture thereof.

Preference is given to using aromatic polyamides which form isotropic solutions in polar aprotic organic solvents and which contain at least two, in particular three, different structural repeat units which differ in the diamine units.

Preferably the aramid is a polymer with the structural repeat units of the formulae I, II and optionally III

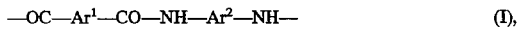

where $Ar^1$, $Ar^2$, $Ar^3$ and $Ar^4$ are each independently of the others a bivalent monocyclic or polycyclic aromatic radical whose free valences are disposed para or meta or comparably parallel, coaxial or angled to each other, and $Ar^2$, $Ar^3$ and, if present, $Ar^4$ each have different individual meanings within the scope of the given definitions, and the respective monomer components underlying the polymer are selected so as to produce an aromatic polyamide which forms isotropic solutions in organic solvents.

Any bivalent aromatic radicals whose valence bonds are disposed para or comparably coaxial or parallel to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded linearly to one another via C—C bonds or via —CO—NH— groups.

The valence bonds in mutually coaxial or parallel disposition point in opposite directions. An example of coaxial bonds pointing in opposite directions are the biphenyl-4,4'-ylene bonds. An example of parallel bonds pointing in opposite directions are the naphthylene-1,5 or -2,6 bonds, whereas the naphthylene-1,8 bonds are parallel but point in the same direction.

Examples of preferred bivalent aromatic radicals whose valence bonds are disposed para or comparably coaxial or parallel to each other are monocyclic aromatic radicals having free valences disposed para to each other, especially 1,4-phenylene, or bicyclic fused aromatic radicals having parallel bonds pointing in opposite directions, especially 1,4-, 1,5- and 2,6-naphthylene, or bicyclic aromatic radicals linked by a C—C bond and having coaxial bonds pointing in opposite directions, especially 4,4'-biphenylylene.

Any bivalent aromatic radicals whose valence bonds are disposed meta or comparably angled to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded to one another via C—C bonds or via bridging groups such as —O—, —CH$_2$—, —S—, —CO— or —SO$_2$—.

Examples of preferred bivalent aromatic radicals whose valence bonds are disposed meta or comparably angled to each other are monocyclic aromatic radicals having free valences disposed meta to each other, especially 1,3-phenylene, or bicyclic fused aromatic radicals having mutually angled bonds, especially 1,6- and 2,7-naphthylene, or bicyclic aromatic radicals linked via a C—C bond but having mutually angled bonds, especially 3,4'-biphenylylene.

Minor portions, for example up to 5 mol %, of the monomer units, based on the polymer, can be aliphatic or cycloaliphatic in nature, for example alkylene or cycloalkylene units.

Alkylene is to be understood as meaning branched and especially straight-chain alkylene, for example alkylene having two to four carbon atoms, especially ethylene.

Cycloalkylene radicals are for example radicals having five to eight carbon atoms, especially cycloalkylene.

All these aliphatic, cycloaliphatic or aromatic radicals can be substituted by inert groups. These are substituents which have no adverse effect on the contemplated application.

Examples of such substituents are alkyl, alkoxy or halogen.

Alkyl is to be understood as meaning branched and especially straight-chain alkyl, for example alkyl having one to six carbon atoms, especially methyl.

Alkoxy is to be understood as meaning branched and especially straight-chain alkoxy, for example alkoxy having one to six carbon atoms, especially methoxy.

Halogen is for example fluorine, bromine or in particular chlorine.

Preference is given to aromatic polyamides based on unsubstituted radicals.

The dicarboxylic acid unit in the aromatic polyamides comprising the repeating structural units of the formulae I, II and optionally III is preferably terephthalic acid.

Examples of preferred diamine combinations from which these preferred structural repeat units of the formulae I, II and III are derived are 1,4-phenylenediamine, 4,4'-diaminodiphenylmethane and 3,3'-dichloro-, 3,3'-dimethyl- or 3,3'-dimethoxybenzidine; also 1,4-phenylenediamine, 1,4-bis(aminophenoxy)benzene and 3,3'-dichloro-, 3,3'-dimethyl- or 3,3'-dimethoxybenzidine; and also 1,4-phenylenediamine, 3,4'-diaminodiphenyl ether and 3,3'-dichloro-, 3,3'-dimethyl- or 3,3'-dimethoxybenzidine; and also 1,4-phenylenediamine, 3,4'-diaminodiphenyl ether and 4,4'-diaminobenzanilide; and also 1,4-phenylenediamine, 1,4-bis(aminophenoxy)benzene and 3,4'-diaminodiphenyl ether.

Aramids which are derived from such diamine combinations and which are preferably for use according to the present invention are described in EP-A-199,090, EP-A-364,891, EP-A-394,892, EP-A-394,893 and EP-A-424,860.

The aromatic polyamides to be used according to the present invention are known per se and can be prepared by methods known per se.

Preference is given to using aromatic polyamides with the above-defined structural repeat units of the formulae I, II and optionally III where Ar$^1$ is a bivalent monocyclic or polycyclic aromatic radical whose free valences are disposed para or comparably parallel or coaxial to each other, Ar$^2$ is a bivalent monocyclic or polycyclic aromatic radical whose free valences are disposed para or comparably parallel or coaxial to each other, Ar$^3$ is a radical of the formula IV

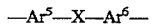  (IV), where Ar$^5$ and Ar$^6$ are each independently of the other a bivalent monocyclic or polycyclic aromatic radical whose free valences are disposed para or comparably parallel or coaxial to each other or where Ar$^6$ additionally is a bivalent monocyclic or polycyclic aromatic radical whose free valences are disposed meta or comparably angled to each other, X is a group of the formula —O—, —S—, —SO$_2$—, —O—phenylene—O—or alkylene, and where Ar$^4$ has one of the meanings defined for Ar$^2$ or Ar$^3$ but differs from the particular Ar$^2$ or Ar$^3$ of a molecule.

Particularly preferred aramids of this type are polymers where Ar$^1$ is 1,4-phenylene, Ar$^2$ is 1,4-phenylene or a bivalent radical of 4,4'-diaminobenzanilide, Ar$^5$ and Ar$^6$ are each 1,4-phenylene, X is —O—, —CH$_2$— or —O—1,4-phenylene—O—, and Ar$^4$ is a bivalent radical of 3,4'-diaminodiphenyl ether, of 3,3'-dichlorobenzidine, of 3,3'-dimethylbenzidine or of 3,3'-dimethoxybenzidine.

The copolycondensation of aromatic polyamides to be formed according to the invention is generally carried out as a solution polymerization in a conventional manner.

In a preferred embodiment of the solution polycondensation, the aromatic monomeric diamines are dissolved in an amide solvent. The solution thus obtained is then mixed with the at least one aromatic monomeric compound in the form of an aromatic dicarbonyl dihalide by vigorous stirring to initiate the polycondensation.

In this process, the amide solvent is used not only as solvent for the aromatic monomeric compounds and the aromatic copolyamide obtained therefrom but also as acid acceptor for a hydrogen halide, for example for hydrogen chloride, which is formed as a by-product of the copolymerization of the aromatic monomeric compounds. In some cases it can be advantageous to use a solubility-promoting additive, for example a metal halide of one of the metals of group I or II of the periodic table, which is added to the polycondensation mixture before, during or after the polycondensation.

Examples of such additives are alkali metal halides, such as lithium chloride, or alkaline earth metal halides, such as calcium chloride.

The polycondensation temperatures for a solution polymerization are customarily between −20° C. and +120° C., preferably between +10° C. and +100° C. Particularly good results are obtained at reaction temperatures between +10° C. and +80° C.

The sum of the concentrations of the aromatic monomer compounds in the polycondensation mixture solution can be set having regard to the desired degree of polycondensation, the viscosity desired for the polycondensation mixture, the nature of the aromatic monomer compounds used, the nature of the solvent used and the desired polycondensation temperature. Which is the most favorable sum of the concentrations can be determined on the basis of a series of preliminary experiments on the course of the polycondensation.

Polycondensation reactions are preferably carried out so that, after the reaction has ended, from 2 to 15, preferably from 3 to 12, % by weight of polycondensate are present in the solution. Particularly good results are obtained with concentrations of from 4 to 6% by weight.

In the course of the polycondensation, the molecular weight of the polymer increases, and so does the viscosity of the reaction batch.

An adequate molecular chain length has been reached when the viscosity of the polymer solution obtained in the course of the polycondensation corresponds to an inherent viscosity of the polymer of more than 3.0 dl/g, preferably more than 5.0 dl/g, in particular from 4.5 to 8.0 dl/g.

By inherent viscosity is meant the expression:

$$\eta_{inh} = \frac{\ln \eta_{rel}}{c}.$$

where $\eta_{rel}$ is the relative viscosity and c is the concentration in g/100 ml.

For the purposes of the present invention, the inherent viscosity is determined on solutions of 0.25% of polymer in N-methylpyrrolidone at 25° C.

Once the polymer solution has reached the viscosity required for further processing, the polycondensation can be terminated in a conventional manner by addition of monofunctional compounds, e.g. acetyl chloride. Then the hydrogen chloride formed, which is present as a salt with the amide solvent, can be neutralized through the addition of basic substances.

Suitable for the purpose are for example lithium hydroxide, calcium hydroxide, but in particular calcium oxide.

The aromatic polyamide obtained on carrying out the production process can be collected from the polycondensation mixture by a separating process, for example by precipitation. To produce a solution for extruding the copolyamide, the aromatic polyamide thus isolated is then dissolved in a suitable polar aprotic organic solvent.

In those cases where the aromatic polyamide was prepared using the method of solution polycondensation, the polyamide, being highly soluble in the solvent used for the polycondensation, is, however, completely dissolved therein. In an industrial use of the production process it is therefore advantageous to use the mixture obtained in the polycondensation directly as the forming solution for the aromatic polyamide.

In the process for preparing the forming solution of the aromatic polyamide, the solvent used is preferably of the amide type, in particular one of the abovementioned solvents of the amide type or a mixture of two or more of said compounds.

The solution thus prepared is divided and part is used for preparing the premix. For this purpose, the solution comprising a polar aprotic organic solvent and 5 to 30% by weight of the aromatic polyamide is provided with 0.5 to 5% by weight of a color-conferring solid component or a mixture of color-conferring solid components and ground until the particles of the color-conferring solid component(s) have an average diameter of less 200 run, preferably from 80 to 150 nm.

The quantities specified for the individual ingredients of the premix are each based on the total amount of the premix.

The color-conferring solid component(s) obtained in the premix are notable for the low level of particles of higher diameter. In the case of carbon black, the proportion of particles having diameters of greater than 200 nm is less than 20% by weight, based on the total amount of the particles.

A further quantity for characterizing the color-conferring solid component(s) contained in the premix of the present invention is the D50 value. It is obtained as a result of the cumulation of the measurements of a particle size distribution. The quantities of the individual particle size fractions are summed starting from the smallest particle diameters present. The D50 value corresponds to the particle diameter possessed by the fraction in the 50% by weight sum which has the largest particle diameter.

In the case of carbon black, the D50 values in the premix of the present invention are customarily less than 100 nm. Color pigments generally have higher D50 values.

The grinding can be carried out with any desired apparatus, as long as the above-defined particle diameters can be obtained therewith. Preference is given to using bead or ball mills.

The grinding time can depend on various factors, for example on the type of mill and on the type of solid component, and preferably ranges from 2 to 8 hours.

The grinding in the presence of aromatic polyamides stabilizes the freshly ground pigment particles against re-agglomeration, makes it possible to set the pigment paste to a desired rheology, and lengthens the storage and/or service life of the pigment dispersion.

After grinding, the premix can be used directly for preparing the forming solution. Preferably the premix is filtered before further use in order that any coarse particles of the solid component and/or gel particles of the aromatic polyamide may be removed.

The filtration is preferably carried out by passing the ground premix through steel filter sheets, in particular those having a pore size of 5 to 10 μm.

The color-conferring solid component used can be any desired black or color pigment, provided it is stable under the conditions under which the formed structures are produced. Selection criteria for the pigments to be used according to the present invention include for example temperature and solvent stability and also stability in environments involving high shearing forces (as occur for example in the course of the passage of the solutions through spinnerets). It is also possible to use pigment mixtures.

Examples of preferred solid components are pigments of the Fast Red, Fast Blue or Fast Yellow types, but particularly preferably carbon black, especially the carbon black ®PRINTEX-U from Degussa.

Examples of pigment classes which can be used for the present invention are phthalocyanines, dyes with perylene structures or dyes with diazo structures.

The premix thus prepared is used for preparing a forming solution for producing the film or fiber.

For this purpose, part of the starting solution comprising a polar aprotic organic solvent and the aromatic polyamide is combined with the premix immediately upstream of the forming die.

This is preferably effected by metering the two streams of starting solution and premix via a static mixer located immediately upstream of the forming die.

It is of course also possible to use other mixers which are usable in a continuous flow system.

To prepare the forming solution it is advantageous to maintain the concentration of the aromatic polyamide within a range between 3 and 12% by weight, in particular between 4 and 6% by weight. Appropriate choice of the polymer concentrations in the premix and in the starting solution makes it possible to set the desired concentrations.

If necessary, the forming solution may contain a solubility-promoting additive, in which case at least one metal halide of a metal of groups I and II of the periodic table can be used, for example lithium chloride, calcium chloride or magnesium bromide, and in a concentration between 0.2 and 10%, preferably between 0.5 and 5%, based on the total weight of the forming solution. This solubility-promoting additive also enhances the stability of the forming solution at elevated temperature. The addition can be added over the premix and/or over the starting solution.

The forming from the forming solution, preferably the spinning of a spinning solution by the process of the present invention can be carried out by any suitable dry process, wet process or dry-wet process. In those cases where a wet process is used, the forming solution is extruded through a die into a coagulating liquid. It is usually advantageous in this connection for the coagulating liquid to comprise water or a water-containing solution of a polar aprotic organic solvent. This polar aprotic organic solvent can be selected from the same amide solvents which are usually used for dissolving the aromatic polyamide.

The polar aprotic organic solvent used in the coagulation liquid is preferably the same solvent as is present in the forming solution. The coagulation liquid is preferably used at a temperature between 0° C. and the boiling point of the coagulation liquid at atmospheric pressure.

The polar aprotic organic solvent is preferably present in the coagulation liquid in a concentration of not greater than 70% by weight, in particular less than 50% by weight.

In the production of film or fiber from the aromatic polyamide, the forming solution is extruded through a die head having one or more orifices, the filamentary or film-shaped streams of the forming solution being solidified in one of the above-indicated coagulation liquids (wet process) or in an evaporation-promoting atmosphere (dry process). A similarly useful variant is the dry jet-wet spinning process as described for example in U.S. Pat. No. 3,414,645.

The spinning apparatus used can be a customary horizontal or vertical wet spinning machine, a dry jet-wet spinning machine or a spinning machine in which the material flows downward under tension.

The size of the holes in the spinneret must be chosen so as to produce a film of the desired basis weight or a filament of the desired linear density.

The spinnerets used customarily have hole diameters of from 0.05 to 1.0 mm. These spinnerets can have single holes (for the production of monofilaments) or else a plurality of holes (for the production of multi-filaments).

Step d) can involve evaporating the solvent using elevated temperature so as to produce a solvent-leaner formed structure of adequate mechanical stability and nontackiness for further processing (dry forming process).

Preferably, step d) involves introducing the primary formed structure into a bath comprising a coagulation liquid so that the organic solvent is removed from said primary formed structure and the desired formed structure is formed by coagulation of the primary structure which has adequate mechanical stability for further processing (wet forming process).

The introducing of the primary formed structure may take the form of direct extrusion into a coagulation liquid or the form of extrusion into a coagulation liquid after passage through an air gap of predetermined length.

In the wet forming of an aromatic polyamide according to the invention, the coagulation is preferably effected using a coagulation liquid comprising a coagulation-promoting additive, and this coagulation is followed by a further coagulation step whereby the coagulating films or filaments of the aromatic polyamide are passed into a waterbath maintained at a temperature between 0 and 100° C.

The additional coagulation step serves to complete the coagulation by removing the solvent. Moreover, the coagulation-promoting additives, if such substances are used, are washed out of the coagulated films or filaments.

It is clear from the foregoing that the process of the invention can be carried out using customary forming apparatus without having to use a dangerous or harmful solvent such as concentrated sulfuric acid. This reduces the risks to the operating personnel.

The films or filaments produced according to the invention are usually subjected to an orienting process which promotes not only the mechanical properties, for example the tensile strength and the modulus of elasticity, but also the thermal properties, for example the thermal stability, of the fibers thus produced.

Filaments are generally oriented to a high mechanical strength and a high modulus of elasticity by drawing. The draw ratio employed customarily ranges from about 1:6 to 1:20. The drawing temperature is generally between 250° and 500° C., preferably between 300° and 480° C.

Drawing can be carried out in a single or in two or more steps, and a hotplate or a cylindrical heater can be used. In addition, the drawn filaments can be subjected to a further heat treatment at the same or at a higher temperature in order that their crystalline structure may be enhanced.

The process of the present invention can be carried out using a conventional drawing finish.

Especially the fibers obtainable by the process of the present invention are notable for excellent mechanical properties, such as high breaking strength and initial moduli and low breaking extensions, and also for a high luster. Furthermore, relatively coarse fibers are simple to produce.

Surprisingly, the addition of the color-conferring solid component has only little effect on the mechanical properties of the ready-produced fibers compared with the uncolored fibers.

The present invention also provides the mass-colored fiber based on aromatic polyamides, in particular with a filament linear density of at least 1.0 dtex, comprising, as the fiber-forming substance, at least one aromatic polyamide which is soluble in polar aprotic organic solvents and 0.5 to 5% by weight, based on the fiber, of at least one color-conferring solid component having an average particle diameter of less than 200 nm, in particular from 80 to 150 nm, said fiber having a smooth surface characterized by the proportion of radiation reflected on measurement parallel to the fiber axis being at least 6.0%, preferably from 7 to 10%.

The measurement of the proportion of reflected radiation is carried out using a gonio photometer as described in Textil-Praxis, 1966, (7), pages 512–516.

The fiber of the present invention preferably has a filament linear density of 1 to 50 dtex, in particular 1 to 30 dtex.

The tenacity of the fiber of the present invention is preferably 130 to 260 cN/tex, in particular 160 to 200 cN/tex.

Very particular preference is given to mass-colored fiber, as defined above, whose tenacity is more than 160 cN/dex and whose breaking extension is 3 to 5%.

The initial modulus, based on 100% extension, of the mass-colored fiber of the present invention is preferably 30 to 80 N/rex.

The cross section of the individual filaments of the fiber of the present invention can be optional, for example triangular, tri- or multilobal or in particular elliptical or round.

The fiber of the present invention, which has excellent mechanical and thermal properties and is notable for high drawability, can be used in industry in a wide variety of ways, for example as reinforcing material, for example for the reinforcement of car tires and other rubber articles and in particular for the reinforcement of hydraulically setting materials, as heat-resistant insulator materials, for producing filter fabrics and as insulating materials.

The present invention further provides a premix for mass-coloring formed structures based on aromatic polyamides, comprising a) 0.5 to 5% by weight of an aromatic polyamide, b) 5 to 30% by weight of a color-conferring solid component whose particles have an average diameter of less than 200 nm, in particular from 80 to 150 nm, and c) 65 to 94.5% by weight of a polar aprotic organic solvent which is preferably consonant with the polar aprotic organic solvent used in the forming solution.

Further properties and advantages of the invention will be now more particularly described by way of example with reference to the accompanying drawing.

The drawing illustrates part of an apparatus for carrying out the process of the present invention.

A reservoir vessel (1) is charged with a presolution consisting of N-methylpyrrolidone and aromatic polyamide. A further reservoir vessel (2) is charged with a premix consisting of N-methylpyrrolidone, aromatic polyamide and carbon black. The premix in reservoir vessel (2) is previously ground in a bead or ball mill not illustrated and then filtered through a steel filter panel so that the average diameter of the carbon black particles is 80 to 150 nm.

The average particle diameter is determined by the following method:

The dispersion is diluted to a concentration of 0.1% by adding it with a Pasteur pipette to N-methylpyrrolidone with stirring. This is followed by 20 minutes' sonication in an ultrasonic bath.

The measurement is carried out with a photocentrifuge of the type Shimadzu SA-CP2 by the suspension method. For this, the above-described suspension is introduced into the measurement cuvette up to a predetermined level and sedimented at a speed of 3000 rpm. The sedimentation process is detected by measuring the absorbance with white light as a function of the sedimentation time.

The average particle diameter is taken to be the D50 value.

Both the reservoir vessels (1) and (2) contain a protective gas atmosphere. The reservoir vessels (1) and (2) are supplied by an incoming line (3) and an outgoing line (4).

The presolution of reservoir vessel (1) is removed via an outgoing line (7) and supplied to the conveyor pump (10). The premix of reservoir vessel (2) is removed via an outgoing line (8) and supplied to the conveyor pump (6). The line (9) from conveyor pump (6) leads into the outgoing line (7) at a point upstream of conveyor pump (10).

The combined streams of presolution and premix are fed by a conveyor pump (10) toward a static mixer (11) which leads directly into the spinning pump (12). From there the spinning solution is forced via line (13) through the spinneret (14) into the coagulation bath (15) and the resulting primary filament is withdrawn via the take-off godet (16). The primary filament obtained is then continuously supplied to a roll trio (17), from where it passes into the aftertreatment section (18) not illustrated.

The reservoir vessels (1) and (2), the mixer (11) and the line (13) are each equipped with a jacket (19) to allow thermostating of the solutions present therein. Preferably the jackets (19) are interconnected so that the temperatures in these locations are in each case the same. This is illustrated in the drawing by line (20).

The conveyor pumps are each preferably equipped with a manometer (21). Furthermore, in the conveyor lines, the pressure on the spinning solution is preferably monitored downstream of the static mixer (11) by means of pressure sensors (22).

The illustrated apparatus was used to spin aromatic polyamides of the following composition with carbon black as pigment into mass-colored filaments:

EXAMPLES 1–8

Polyamide I used had the following composition: Aromatic polyamide based on terephthaloyl dichloride 25 mol % para-phenylenediamine, 50 mol % of 3,3'-dimethylbenzidine and 25 mol % of 1,4-bis(4-aminophenoxy)benzene.

The proportion of carbon black in the filament was 1.5% by weight, based on filament dry matter; the carbon black used was ®PRINTEX-U from Degussa.

The filaments obtained were conventionally washed, dried, drawn and wound up.

The filaments obtained have the following properties:

| Example | 1 | 2 | 3 | 4 | 5 |
|---|---|---|---|---|---|
| Polyamide type | I | I | I | I | I |
| Draw ratio 1: | 11.2 | 7.8 | 7.1 | 5.9 | 5.4 |
| Multifilament linear density (dtex) | 220 | 220 | 220 | 440 | 440 |
| Tensile strength (cN/tex) | 206 | 172 | 158 | 181 | 163 |
| Initial modulus (N/tex) | 61 | 56 | 56 | 58 | 57 |
| Breaking extension (%) | 3.7 | 3.3 | 3.1 | 3.4 | 3.1 |

| Example | 6 | 7 | 8 | 9 |
|---|---|---|---|---|
| Polyamide type | I | I | I | I |
| Draw ratio 1: | 10.4 | 10.3 | 10.2 | 10.2 |
| Multifilament linear density (dtex) | 840 | 440 | 440 | 440 |
| Tensile strength (cN/tex) | 191 | 198 | 204 | 190 |
| Initial modulus (N/tex) | 62 | 62 | 60 | 60 |
| Breaking extension (%) | 3.2 | 3.3 | 3.7 | 3.5 |
| Reflectance measurement (%)[1] | — | — | 6.0 | 7.5 |

[1] Determined by measuring the proportion of reflected radiation parallel to the fiber axis using a gonio photometer as described in Textil-Praxis, 1966, (7), pages 512–516.

EXAMPLE 9

Instead of polyamide I, spinning trials were repeated with a polyamide II of the following composition: aromatic polyamide based on terephthaloyl chloride, 50 mol % of para-phenylenediamine, 35 mol % of 3,4'-diaminodiphenyl ether and 15 mol % of 1,4-bis(4-aminophenoxy)benzene.

The proportion of carbon black in the filament was 3 to 3.5% by weight based on the filament dry matter; the carbon black used was ®PRINTEX-U from Degussa.

The filaments obtained were conventionally washed, dried, drawn and wound up.

The filaments obtained have the following properties:

| Example | 9 |
| --- | --- |
| Polyamide type | II |
| Draw ratio 1: | 10 |
| Tensile strength (cN/tex) | 215 |
| Initial modulus (N/tex) | 48 |
| Breaking extension (%) | 4 |

What is claimed is:

1. A process for producing mass-colored fiber or film, comprising the steps of:
   a) preparing a premix by grinding a composition comprising a polar aprotic organic solvent, 5 to 30% by weight of an aromatic polyamide and 0.5 to 5% by weight of a color-conferring solid component so that the color-conferring solid component has particles with an average diameter of less than 200 nm,
   b) preparing a forming solution by mixing the premix produced in step a) and a solution comprising a polar aprotic organic solvent and an aromatic polyamide which corresponds to the aromatic polyamide used in step a), just upstream of a forming die,
   c) extruding the forming solution through the forming die which comprises orifices in a predetermined number and shape to produce primary fiber or film,
   d) removing the polar aprotic organic solvent to leave solvent-leaner or -free fiber or film of sufficient mechanical stability and nontackiness for further processing, and
   e) optionally orienting the resulting fiber or film.

2. The process of claim 1 wherein the grinding to prepare the premix takes place in a bead or ball mill.

3. The process of claim 2 wherein the grinding to prepare the premix takes from two to eight hours.

4. The process of claim 1 wherein the polar aprotic organic solvent used in steps a) and b) is N-methylpyrrolidone.

5. The process of claim 1 wherein the aromatic polyamide used in steps a) and b) is a polymer with the structural repeat units of the formulae I, II and optionally III —OC—Ar¹—CO—NH—Ar²—NH—    (I), —OC—Ar¹—CO—NH—Ar³—NH—    (II), —OC—Ar¹—CO—NH—Ar⁴—NH—    (III), where $Ar^1$, $Ar^2$, $Ar^3$ and $Ar^4$ are each independently of the others a bivalent monocyclic or polycyclic aromatic radical whose free valences are disposed para or meta or comparably parallel, coaxial or angled to each other, and $Ar^2$, $Ar^3$ and, if present, $Ar^4$ each have different individual meanings within the scope of the given definitions, and the respective monomer components are selected so as to produce an aromatic polyamide which forms isotropic solutions in organic solvents.

6. The process of claim 5 wherein $Ar^1$ is a bivalent monocyclic or polycyclic aromatic radical whose free valences are disposed para or comparably parallel or coaxial to each other, $Ar^2$ is a bivalent monocyclic or polycyclic aromatic radical whose free valences are disposed para or comparably parallel or coaxial to each other, $Ar^3$ is a radical of the formula IV —Ar⁵—X—Ar⁶    (IV), where $Ar^5$ and $Ar^6$ are independently of each other a bivalent monocyclic or polycyclic aromatic radical whose free valences are disposed para or comparably parallel or coaxial to each other or where $Ar^6$ additionally is a bivalent monocyclic or polycyclic aromatic radical whose free valences are disposed meta or comparably angled to each other, X is a group of the formula —O—, —S—, —SO₂—, —O—phenylene—O— or alkylene, and where $Ar^4$ has one of the meanings defined for $Ar^2$ or $Ar^3$ but differs from the particular $Ar^2$ or $Ar^3$ of a molecule.

7. The process of claim 6 wherein $Ar^1$ is 1,4-phenylene, $Ar^2$ is 1,4-phenylene or a bivalent radical of 4,4'-diaminobenzanilide, $Ar^5$ and $Ar^6$ are each 1,4-phenylene, X is —O—, —CH₂— or —O—1,4-phenylene—O—, and $Ar^4$ is a bivalent radical of 3,4'-diaminodiphenyl ether, of 3,3'-dichlorobenzidine, of 3,3'-dimethylbenzidine or of 3,3'-dimethoxybenzidine.

8. The process of claim 1 where the color-conferring solid component used in step a) is carbon black.

9. The process of claim 1 where the mixing of step b) takes place in a static mixer positioned immediately upstream of the conveying pump for the forming die.

10. The process of claim 1 where step d) comprises introducing the primary fiber or film formed in step c) into a bath comprising a coagulation liquid so that the organic solvent is removed from said primary fiber or film and the desired fiber or film is formed by coagulation of the primary structure which has adequate mechanical stability for further processing.

* * * * *

UNITED STATES PATENT AND TRADEMARK OFFICE
CERTIFICATE OF CORRECTION

PATENT NO. : 5,662,852
DATED : September 2, 1997
INVENTOR(S) : UWE KAMPSCHULTE ET AL.

It is certified that error appears in the above-identified patent and that said Letters Patent is hereby corrected as shown below:

On the title page, item [54] and col. 1, line 1, before "MASS" (first occurrence) insert --PRODUCTION OF--.

Column 1, line 56, "200 mn" should read --200 nm,--.
Column 6, line 6, "200 run" should read --200 nm--.
Column 9, line 6, "80 N/rex" should read --80 N/tex--.
Column 11, line 25, (claim 1, line 6), after "component" insert --, both based on the overall weight of the premix,--.

Signed and Sealed this

Sixteenth Day of December, 1997

Attest:

BRUCE LEHMAN

Attesting Officer

Commissioner of Patents and Trademarks